United States Patent
Howlett et al.

[15] 3,673,644
[45] *July 4, 1972

[54] TENDON ANCHORAGE

[72] Inventors: George H. Howlett, Oakland; James W. Howlett, Richmond Annex, both of Calif.

[73] Assignee: Howlett Machine Works

[ * ] Notice: The portion of the term of this patent subsequent to July 13, 1987, has been disclaimed.

[22] Filed: July 10, 1970

[21] Appl. No.: 53,787

Related U.S. Application Data

[63] Continuation-in-part of Ser. No. 751,951, Aug. 12, 1968, Pat. No. 3,520,032.

[52] U.S. Cl.................................24/122.6, 287/114, 52/223
[51] Int. Cl...........................................................F16g 11/00
[58] Field of Search...............287/114; 24/126, 122; 52/223, 52/230

[56] References Cited

UNITED STATES PATENTS 3,520,032  7/1970  Howlett et al. ......................24/122.6

3,326,791  6/1967  Heuze....................................24/126

*Primary Examiner*—Bobby R. Gay
*Assistant Examiner*—Garry Moore
*Attorney*—Warren, Rubin, Brucker & Chickering

[57] ABSTRACT

A tendon anchorage, primarily for use in pre-tensioning and post-tensioning concrete, in which the anchorage includes an axially convergent bore and a tendon gripping wedge assembly disposed in the bore. The wedge assembly preferably includes two wedges in which interiorly located gripping portions for engaging the tendons are formed. The gripping portions may be aligned along opposed internal faces of the wedges. One or more slots or grooves, which may be angularly skewed to the longitudinal axis of the wedge assembly, extend from the gripping portions toward or through to the peripheral wall of the wedges over a portion of the axial length to provide relatively movably wedge segments adjacent the gripping portions which afford the desired wedge assembly flexure and the addition of gripping forces.

6 Claims, 6 Drawing Figures

PATENTED JUL 4 1972
3,673,644
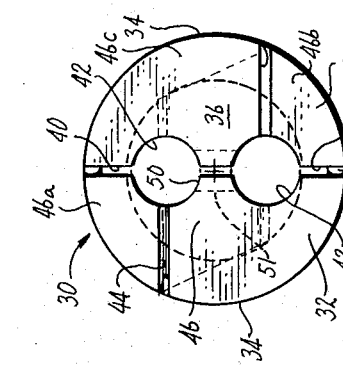
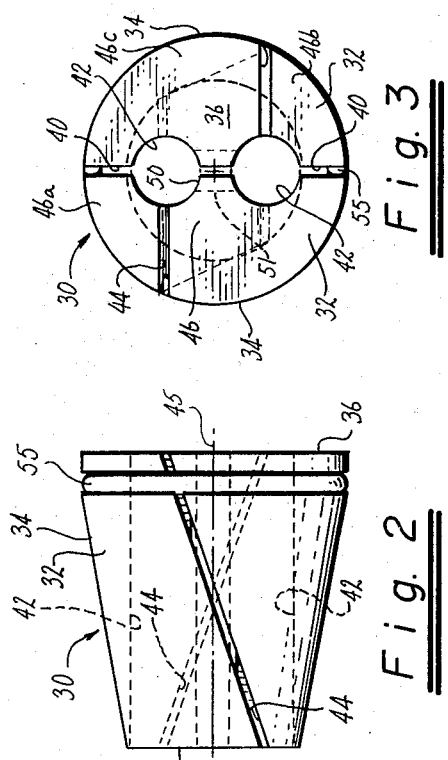
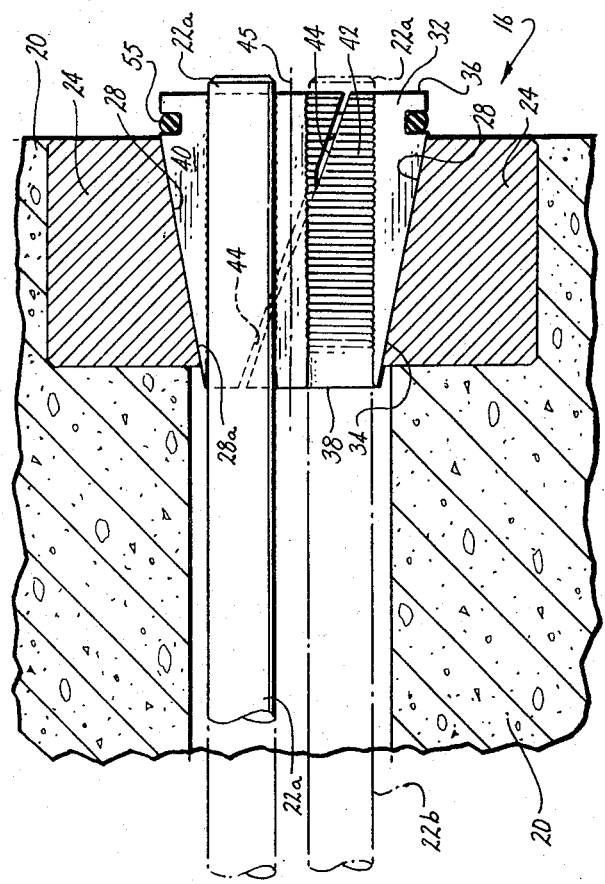
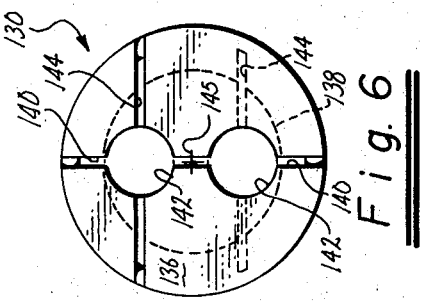
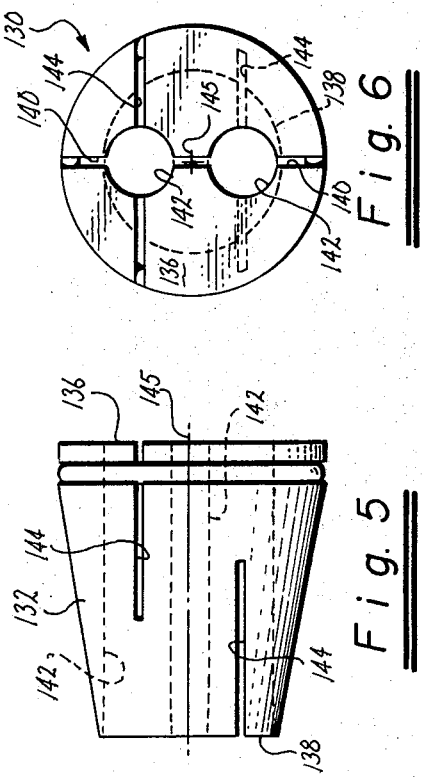
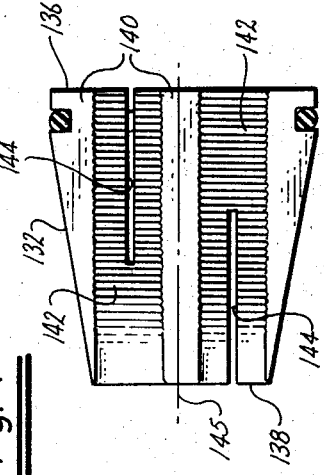
INVENTORS
George H. Howlett
James W. Howlett
BY Warren, Rubin, Brucker &
Chickering Attorneys

TENDON ANCHORAGE

RELATED APPLICATION

This is a continuation-in-part of application Ser. No. 751,951, filed Aug. 12, 1968, issued as U.S. Pat. No. 3,520,032 on July 14, 1970.

BACKGROUND OF THE INVENTION

Tendon anchorages have been employed which include a relatively large number of tendon gripping wedges which must be carefully assembled prior to tensioning the tendons. When in place, the wedges subject the tendons to gripping forces which result from the tension of each tendon. These gripping forces are additive so that each tendon is subjected to a gripping force which is many times greater than the gripping force it would be subjected to if the anchorage had only one tendon. The addition of the gripping force from each tendon to all others (disregarding frictional losses) was previously obtained through the use of individual wedges which, when pulled further into the tapered bore of the anchorage member, increasingly press toward each other.

In past tendon anchorages in which only a few tendons, say two or three, are to be anchored, the anchorages were constructed in the form of two wedges, each wedge extending over about 180 of the tapered bore in the anchorage member. The peripheral wall of this type of wedge anchorage must be constructed with a high degree of accuracy since even slight variations in the configuration of the wall, relative to the tapered bore in the anchorage member, can cause "bridging" or binding of the wedges in the bore. Such bridging prevents the wedges from fully entering the tapered bore and from fully gripping the tendons.

Accordingly, it is an object of the tendon anchorage of the present invention to provide a wedge assembly which will achieve an addition of gripping forces, minimize the number of separate wedge pieces, and avoid premature binding of the wedge assembly in the anchor member.

SUMMARY OF THE INVENTION

Briefly, the present invention provides a wedge assembly for insertion into an anchor member formed with a wall defining a convergently tapered bore. The bore is dimensioned at its smallest diameter to receive a plurality of tendons to be tensioned. The wedge assembly is mountable in the bore and has a peripheral wall formed for sliding axial engagement with the bore defining wall in the direction of convergence of the bore. The wedge assembly has side faces extending from the peripheral wall and tendon gripping portions formed therein and is further formed for positioning in the bore with the side faces and the gripping portions, respectively, in opposed relation. The wedge assembly includes axially extending grooves which also extend laterally from the gripping portions toward the peripheral wall to allow flexure or collapsing of the wedges in the assembly. Such flexure avoids bridging and utilizes the components of radial gripping force which are parallel to the interior opposed faces of the wedges. Further, alignment of two or more tendons between the opposed interior wedge faces together with such flexure results in the addition of gripping forces in a manner analogous to multiple wedge systems.

In a preferred embodiment of this invention, each tendon gripping portion is provided with a groove, and the groovees in the wedges preferably extend through to the peripheral wall. The grooves may additionally extend over the full axial length of the wedge and be arranged so that they are skewed to the central longitudinal axis of the wedge assembly. Alternatively, the grooves may parallel to the longitudinal axis and extend from either end of the wedge over less than the entire axial length of the wedge.

BRIEF DESCRIPTION OF THE DRAWINGS

FIG. 1 is a side elevational view, in cross section, of a tendon anchorage constructed in accordance with the present invention and cast in a concrete member.

FIG. 2 is a side elevational view of a wedge assembly including two oppositely facing wedges formed in a manner as shown in FIG. 1.

FIG. 3 is an end view of the wedge assembly shown in FIG. 2.

FIG. 4 is a side elevational view of an alternate embodiment of a wedge constructed in accordance with the present invention.

FIG. 5 is a side elevational view of a wedge which faces in a direction opposed to the wedge in FIG. 4.

FIG. 6 is an end view of a wedge assembly formed from the wedges shown in FIGS. 4 and 5.

DESCRIPTION OF THE PREFERRED EMBODIMENTS

Referring to FIGS. 1, 2 and 3, tendon anchorage 16 is shown cast into a concrete member 20, and anchorage 16 is constructed to firmly engage one end of a pair of laterally spaced, elongated and tensioned tendons 22a and 22b (collectively referred to as tendons 22). The tendons are secured at opposite ends and tensioned in a known manner to impart maximum strength to the concrete member or block. The tendon anchorage comprises an anchor member 24 formed with an interior wall defining a convergently tapered bore 28, the smallest transverse dimension or diameter 28a being sufficient to receive the pair of tendons 22.

Disposed within bore 28 is a wedge assembly 30, including a pair of juxtaposed wedges 32 which have peripheral walls 34 of a configuration complimentary to that of the bore in the anchor member. Thus, each wedge is tapered in the direction of the bore, and both wedges together define a first end 36 of the wedge assembly having a greater transverse dimension or diameter and a second end 38 having a smaller transverse dimension or diameter. The wedges have interior side faces 40 which extend from the peripheral wall to internally or interiorly disposed recessed gripping portions 42. The side faces and the gripping portions are arranged so that when the wedges are positioned in the bore, the faces and the portions, respectively, are in opposed relation to each other. The longitudinal axis of the recessed gripping portions are preferably aligned to fall on a plane parallel to side faces 40 which results in an alignment of the tendons along the side faces and addition of gripping forces, as will be hereinafter explained. Axially extending slots or grooves 44 also extend from gripping portions 42 laterally toward and through to peripheral wall 34. The term "groove," as used herein, shall include a slot which extends to peripheral wall 34, as shown in the drawing, or a groove which stops short of the peripheral wall, as shown in the parent application. As will be understood, therefore, grooves 44 could alternatively be formed as shown in the parent application.

As is best illustrated in FIGS. 1 and 2, grooves 44 are axially extending or oriented and additionally are skewed or angularly displaced from the central longitudinal axis 45 of the wedge assembly. This construction affords the desired flexibility of the wedge assembly while minimizing the number of separate wedge pieces required to form assembly 30. For additional convenience the oppositely facing wedges 32 may be held together by elastic O-ring 55. Grooves 44 also preferably extend laterally toward peripheral wall 34 in a direction transverse to faces 40 and the plane in which the tendons are aligned by gripping portions 42 (as shown in the drawing, substantially the same plane as faces 40).

The efficient utilization of radial gripping forces is achieved in the wedge assemblies herein disclosed in a manner analogous to that of the wedge assemblies of the parent application. In the present wedge assemblies, however, the location and configuration of grooves or slots 44 results in a somewhat varied analysis of the transfer of gripping forces. Basically, in all of the wedge assemblies of the parent application and this application, grooves 44 allow utilization of the components of the radial gripping force generally parallel to opposed internal wedge side faces 40. Thus, as in the parent application, if no grooves or slots 44 were provided the tapered semi-cylindrical wedges would only utilize components of the radial forces transverse to faces 40. Additionally, the inability to flex or collapse in a direction along or parallel to faces 40 would tend to cause wedges 32 to prematurely bridge or span the bore 28 upon urging toward the small diameter end 28a of the anchorage bore.

In the slotted or grooved wedge construction specifically illustrated in FIGS. 1, 2 and 3, the additive effect of the gripping forces can be analyzed as follows. Wedge segment 46a will collapse downwardly (as shown in FIG. 3) along the upper portion thereof due to groove 44 extending transverse to face 40. Thus, it is hypothesized that the components of the radial gripping force parallel to face 40 will be transferred to the top portion of tendon 22a. The forces transferred to tendon 22a will subsequently be transferred to segment 46 of wedge 32 through gripping portion 42. Moreover, the bottom half of segment 46a includes a gripping portion 42 which bears upon tendon 22b. Thus, the transferred force through tendon 22a to segment 46, as well as the forces from the tapered bore directly on the bottom of segments 46 and 46a, all cause the forces parallel to face 40 to be transferred to the bottom portion of tendon 22b. The reverse transfer of forces is effected by segments 46b and 46c of the opposed wedge 32. Tendons 22a and 22b are gripped by the vertical (as shown in FIG. 3) components of the radial forces on both the top and bottom portions thereof by use of the oppositely skewed grooves 44 (the opposed nature of the skew or slant of grooves 44 can best be seen in FIG. 2). This transfer of forces is resisted by a single tendon diameter since tendons 22a and 22b are substantially aligned, and the result is an increase in the gripping force per tendon. This can be contrasted to the horizontal (as seen in FIG. 3) gripping forces which are resisted by two tendon diameters, and therefore, the gripping force per tendon is not increased over the force achieved if only one gripping portion was provided.

It should be noted that the wedge assembly of FIGS. 1, 2 and 3 can utilize a single slot or groove 44 in each wedge, and the slot can extend over the entire axial length of the wedge without creating a multiplicity of wedge pieces. This is possible since protrusion 50 is not slotted and is solid over its length, as shown best in FIG. 3 by bottom 51 of groove 44 which terminates short of face 40. Thus, the section of wedges 32 which is defined by bottom 51 of the grooves and face 40 connects the top of segment 46 to the bottom of segment 46a.

It is possible to modify the skewed groove construction of assembly 30 so that each slanted groove is confined to a single gripping portion and effects only one of the tendons. For example, a skewed groove 44 could be formed from the center of gripping portion 42 at end 35 for tendon 22a to one side of protrusion 50 at end 38, and a second groove 44 from the center of portion 42 at end 36 for tendon 22b to the other side of protrusion 50 at end 38. The other wedge 32 would also be formed with two slanted grooves 44.

An alternative embodiment of the wedge assembly of the present invention is illustrated in FIGS. 4, 5 and 6. The wedge assembly 130 is frusto-conical in form to allow insertion in an anchor member having a mating bore, as is illustrated in FIG. 1. Assembly 130 includes two wedges 132 having opposed internal or interior faces 140. Formed in faces 140 are tendon gripping portions 142 (illustrated as including a series of serrations for frictionally engaging the tendon). In this embodiment grooves 144 extend generally parallel to the central longitudinal axis 145 of the wedge assembly. Additionally, slots or grooves 144 extend from alternate ends 136 and 138 of the wedges and terminate short of the full axial length of the wedge.

The utilization of the components of radial gripping force parallel to faces 140 is as above set forth in connection with wedge assembly 30. The groove configuration, however, results in an upper tendon, such as tendon 22a, being gripped with greater force at end 136 and a lower tendon, such as tendon 22b, being gripped with greater force at end 138. Both tendons are, as is apparent, gripped along their entire lengths of engagement by portions 142 under the action of the gripping force transverse to faces 140. It should be noted that grooves 144 extend axially to a position where they overlap a common line perpendicular to axis 145. Thus, each wedge 132 is provided with a combination of grooves 144 which extend over the entire axial length of the wedges. This desirable result is achieved without severing the wedge into several pieces. It is further contemplated that grooves 144 can be forced to extend from the same end of the wedge (either end 136 or 138) for both tendons. This construction would give highest gripping forces for both tendons at the slotted end of the wedges. The slots would not extend over the entire axial length of the wedges.

It is possible further to combine the groove techniques of assemblies 30 and 130 in a single assembly. Moreover, these groove constructions can be combined with the vertically extending "hinge" groove construction shown and described in the devices of the parent application. It is also an important feature of the present invention that should the anchorage fracture at grooves 44 or 144, there will not be a failure of the anchorage. This is true of all of the slotted wedges illustrated since fracture at the grooves merely causes the sections or segments 46 to act as independent wedges which continue to be urged against the tendons.

By way of example of the constructions of the wedge assemblies of the present invention, the anchorages illustrated in the drawings can be constructed as follows. One-half inch bar tendons have a rated or minimum ultimate strength of 160,000 pounds per square inch or 28–31,000 pounds total load. If such bars are to be secured, anchor member 24 may be formed to have a 2¾ inches outside diameter with a bore of 1½ inches at the large end and about 1⅛ inches at the small end. An anchor member so dimensioned may be formed from 8620 carborized steel heat treated to a Rockwell hardness of 35–40 on the "C" scale. Wedges 32 and 132 may be formed from C–1117 carborized steel heat treated to a surface hardness of about 60 to 65 and a core hardness of about 35 Rockwell C. The wedge length and anchor member length are both about 2 inches. The bore taper may be between 5 to 15.

Tendon anchorages constructed according to this invention are compact and small in size and permit an easy, time saving installation, thereby increasing the economic feasibility of the anchorage. In addition, the advantageous addition of gripping forces found in tendon anchorages having relatively a large number of wedges are retained by virtue of the flexibility of the wedge sections. Larger numbers of tendons can, of course, be gripped by a tendon anchorage constructed according to the present invention.

We claim:

1. In a tendon anchorage including, an anchor member with an interior wall defining a convergently tapered bore over a length thereof, the smallest transversed dimension of said bore being sufficient to receive a plurality of tendons to be tensioned; and a wedge assembly mounted in said bore in sliding engagement with said interior wall, said assembly including at least two wedges each having peripheral walls formed for advancement of said wedges in said bore in the direction of convergence of said bore, said wedges each being formed with side faces extending internally from said peripheral walls, said wedges being mounted in said bore with said side faces in juxtaposed relation, said side faces being further formed with a plurality of recessed tendon gripping portions positioned in said side faces with the longitudinal axes thereof falling generally on a plane parallel to said side faces, each of said wedges further being formed with at least one axially extending groove with at least a portion of said groove extending from each of said plurality of gripping portions laterally toward said peripheral wall in a direction generally transversed to said side face and said plane to define with said side face a pair of wedge segments on opposed sides of part of the axial length of said gripping portions and at least one of said pair of segments being formed for relative displacement toward the other segment in a direction generally parallel to said side face and plane over a portion of the axial length of said wedge upon urging of said assembly in the direction of convergence of said bore, the improvement comprising:

at least one of the grooves in said wedges being skewed to the longitudinal axis of said wedge assembly.

2. The tendon anchorage as defined in claim 1 wherein, said skewed grooves extend from one gripping portion adjacent a first end of said assembly to a second gripping portion adjacent a second end of said wedge assembly.

3. A tendon anchorage as defined in claim 2 wherein, said grooves are formed as slots extending from said gripping portions to said peripheral wall and said grooves terminate short of said side faces between said gripping portions whereby said segments are joined to a common portion of said wedge between said gripping portions.

4. A tendon anchorage comprising:
a. an anchor member with an interior wall defining a convergently tapered bore; and
b. a wedge assembly mounted in said bore in sliding engagement with said interior wall, said assembly including at least two wedges each having peripheral walls formed for advancement of said wedges in said bore, said wedges each being formed with side faces extending internally from said peripheral walls, said wedges being mounted in said bore with said side faces in juxtaposed relation, each said side face being further formed with a plurality of recessed tendon gripping portions, each of said wedges further being formed with at least two grooves extending parallel to the longitudinal axis of said assembly with at lease a portion of each of said grooves extending from each of said plurality of gripping portions laterally toward said peripheral wall in a direction generally transversed to said side face, one of said grooves in a first gripping portion extending from a first end of said assembly toward and terminating short of a second end of said assembly, and another of said grooves in a second gripping portion extending from said second end of said assembly toward and terminating short of said first end of said assembly, said grooves defining with said side face a pair of wedge segments on opposed sides of part of the axial length of said gripping portions, and at least one of said pair of segments being formed for relative displacement toward the other segment in a direction generally parallel to said side face over a portion of the axial length of said wedges upon urging of said assembly in the direction of convergence of said bore.

5. A tendon anchorage as defined in claim 4 wherein, said grooves are formed as slots extending completely through to the peripheral walls of said wedges and said slots extend axially a sufficient length of said wedges to overlap a common plane perpendicular to the longitudinal axis of said assembly.

6. In a wedge assembly for insertion into an anchor member formed with a wall defining a convergently tapered bore over a length thereof dimensioned at the smallest diameter to receive a plurality of tendons to be tensioned, and at least one wedge mountable in said bore and having a peripheral wall formed for axial sliding engagement with said bore defining wall in the direction of convergence of the said bore, said wedge having side faces extending internally from said peripheral wall and having a plurality of recessed tendon gripping portions formed in said side faces to receive a plurality of tendons to be tensioned, said wedge being formed for positioning in said bore with said side faces and said gripping portions, respectively, in opposed relation, said wedge including a plurality of axially extending grooves with at least a portion of one of said grooves extending from each of at least two of said plurality of gripping portions laterally toward said peripheral wall, said grooves and faces defining a pair of wedge segments on opposed sides of said gripping portions formed with said grooves over a portion of the length of said wedge, and at least one of said pair of segments being formed for relative displacement toward the other segment over a portion of its axial length upon mounting of said assembly in said anchor member and tensioning of said tendons, the improvement comprising:

said axially extending grooves being skewed to the longitudinal axis of said wedge assembly.

* * * * *